US010532946B2

(12) United States Patent
Meiss et al.

(10) Patent No.: US 10,532,946 B2
(45) Date of Patent: Jan. 14, 2020

(54) COMPOSITE ELEMENT AND USE THEREOF

(71) Applicant: SCHOTT AG, Mainz (DE)

(72) Inventors: Jens Meiss, Rodgau (DE); Clemens Ottermann, Hattersheim (DE); Hauke Esemann, Wörrstadt (DE); Joerg Hinrich Fechner, Mainz (DE); Markus Heiss-Chouquet, Bischofsheim (DE)

(73) Assignee: SCHOTT AG, Mainz (DE)

( * ) Notice: Subject to any disclaimer, the term of this patent is extended or adjusted under 35 U.S.C. 154(b) by 45 days.

(21) Appl. No.: 15/006,269

(22) Filed: Jan. 26, 2016

(65) Prior Publication Data

US 2016/0137549 A1    May 19, 2016

Related U.S. Application Data

(63) Continuation of application No. PCT/EP2014/064889, filed on Jul. 11, 2014.

(30) Foreign Application Priority Data

Jul. 24, 2013 (DE) .......................... 10 2013 214 426

(51) Int. Cl.
    *C03C 17/32*    (2006.01)
    *C03C 3/085*    (2006.01)
    (Continued)

(52) U.S. Cl.
    CPC ............. *C03C 17/30* (2013.01); *C03C 3/085* (2013.01); *C03C 3/097* (2013.01); *C03C 3/118* (2013.01);
    (Continued)

(58) Field of Classification Search
    None
    See application file for complete search history.

(56) References Cited

U.S. PATENT DOCUMENTS

| | | | |
|---|---|---|---|
| 3,808,077 A * | 4/1974 | Rieser | B32B 17/10018 156/102 |
| 5,318,853 A * | 6/1994 | Bayha | B32B 7/12 428/431 |

(Continued)

FOREIGN PATENT DOCUMENTS

| | | |
|---|---|---|
| CA | 2359366 A1 | 7/2000 |
| DE | 4415878 A1 | 11/1995 |

(Continued)

OTHER PUBLICATIONS

Merriam-Webster Dictionary, definition of "adjacent" (Year: 2018).*

(Continued)

*Primary Examiner* — David Sample
*Assistant Examiner* — Nicole T Gugliotta
(74) *Attorney, Agent, or Firm* — Ohlandt, Greeley, Ruggiero & Perle, L.L.P.

(57) ABSTRACT

A lightweight composite pane is provided that includes a mineral glass or glass-ceramic pane and an organic layer. The weight per unit area of the lightweight composite pane is in the range from 0.5 kg/m² to 5.5 kg/m², the ratio of the thickness of the mineral glass pane to the thickness of the organic layer is 1:0.01 to 1:1, and the thickness of the organic layer is less than or equal to 500 μm. The lightweight composite pane meets the thermal safety requirements of aerospace authorities and has a "Total Heat Release," measured in compliance with JAR/FAR/CS 25, App. F, Part IV & AITM 2.0006, of less than 65 kW×min/m² and a flame time, after removal of the flame in the "Vertical Bunsen Burner Test", measured in compliance with FAR/JAR/CS 25, App. F, Part 1 & AITM 2.0002A, is less than 15 seconds.

26 Claims, 1 Drawing Sheet

(51) Int. Cl.
 *B32B 17/10*  (2006.01)
 *B64C 1/14*  (2006.01)
 *C03C 17/30*  (2006.01)
 *C03C 3/097*  (2006.01)
 *C03C 3/118*  (2006.01)
 *C03C 21/00*  (2006.01)

(52) U.S. Cl.
 CPC .......... *C03C 17/322* (2013.01); *C03C 17/328* (2013.01); *C03C 21/001* (2013.01); *C03C 2217/29* (2013.01); *C03C 2218/11* (2013.01)

(56) References Cited

U.S. PATENT DOCUMENTS

| | | | |
|---|---|---|---|
| 5,589,272 | A | 12/1996 | Braun et al. |
| 6,355,345 | B1* | 3/2002 | Furuya .............. B32B 17/10018 428/343 |
| 6,491,972 | B1 | 12/2002 | Weber et al. |
| 6,815,070 | B1 | 11/2004 | Bürkle et al. |
| 2003/0077453 | A1 | 4/2003 | Oaku et al. |
| 2004/0141141 | A1 | 7/2004 | Ota et al. |
| 2007/0202933 | A1 | 8/2007 | Tolbert et al. |
| 2008/0135175 | A1 | 6/2008 | Higuchi |
| 2009/0049773 | A1 | 2/2009 | Zadesky et al. |
| 2010/0015439 | A1* | 1/2010 | Buether ............ B32B 17/10036 428/337 |
| 2010/0035745 | A1 | 2/2010 | Murata |
| 2010/0076155 | A1* | 3/2010 | Higashiyama ........... C08K 3/40 524/612 |
| 2011/0255034 | A1 | 10/2011 | Nakano et al. |
| 2011/0293942 | A1 | 12/2011 | Cornejo |
| 2012/0082856 | A1 | 4/2012 | Mäder |
| 2012/0094084 | A1* | 4/2012 | Fisher ............... B32B 17/10036 428/174 |
| 2012/0128952 | A1 | 5/2012 | Miwa et al. |
| 2014/0154467 | A1 | 6/2014 | Yanase et al. |
| 2014/0162039 | A1* | 6/2014 | Zachau ................. F41H 5/0407 428/219 |
| 2015/0064374 | A1* | 3/2015 | Jain ................... B32B 17/10036 428/34 |

FOREIGN PATENT DOCUMENTS

| | | |
|---|---|---|
| DE | 19906333 A1 | 8/2000 |
| DE | 102009021938 A1 | 11/2010 |
| DE | 202010013869 U1 | 3/2012 |
| EP | 0669205 A1 | 8/1995 |
| EP | 2040314 A1 | 3/2009 |
| EP | 2128105 A1 | 12/2009 |
| EP | 2732969 A1 | 5/2014 |
| JP | S59216909 | 12/1984 |
| JP | H09124339 | 5/1997 |
| JP | 2008037094 | 2/2008 |
| JP | 2008115072 | 5/2008 |
| JP | 2009186916 A | 8/2009 |
| JP | 2013529172 | 7/2013 |
| NO | 2011152380 A1 | 12/2011 |
| WO | 0041978 A1 | 7/2000 |
| WO | 2012051038 | 4/2012 |
| WO | 2012166343 A2 | 12/2012 |
| WO | 2013008876 A1 | 1/2013 |

OTHER PUBLICATIONS

English translation of International Search Report dated Sep. 30, 2014 for corresponding PCT/EP2014/064889, 4 pages.

English translation of International Preliminary Report on Patentability dated Aug. 6, 2015 for corresponding PCT/EP2014/064889, 9 pages.

Dai, "Aircraft Structure Overhaul", Aviation Industry Press, Dec. 2006, with English summary, 3 pages.

Ding, "Nano Antibacterial Technology" Chemical Industry Press, Jan. 2008, with English summary, 3 pages.

Wang, "Analysis and Application of Polymer Materials", Shanghai Science and Technology Press, Jan. 2009, with English summary, 3 pages.

Yao, "Chemical Knowledge Dictionary", Jinan Press, Sep. 1995, with English summary, 3 pages.

\* cited by examiner

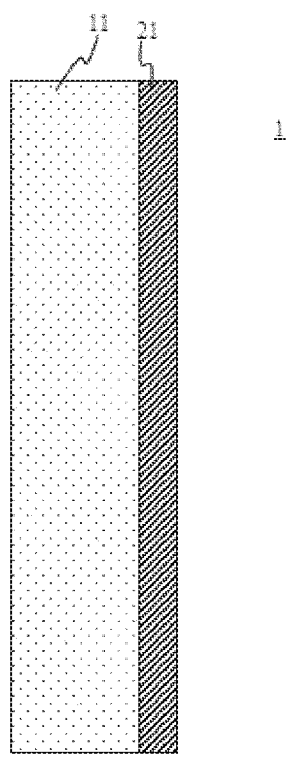

COMPOSITE ELEMENT AND USE THEREOF

CROSS REFERENCE TO RELATED APPLICATIONS

This application is a continuation of International Application No. PCT/EP2014/064889 filed Jul. 11, 2014, which claims benefit under 35 U.S.C. § 119(a) of German Patent Application No. 10 2013 214 426.1 filed Jul. 24, 2013, the entire contents of both of which are incorporated herein by reference.

BACKGROUND

1. Field of the Invention

The present invention relates to a composite element having a mineral glass or glass-ceramic layer and an organic layer that is adjacent to the glass or glass-ceramic layer and having a low total weight per unit area and a low heat release rate as well as to a method for the manufacture and use of such a composite element. The invention further comprises an interior aircraft window pane or lightweight window pane and a smoke barrier element with such a composite element.

2. Description of Related Art

Glass/plastic composite panes or panels for use in vehicles on land, on water, and in the air as well as for use in the field of architecture and in the field of interior furnishings have been described in diverse ways in prior art and meet many requirements that are posed. However, some applications, above all those in the field of transportation, such as in aircraft manufacture and electric vehicle manufacture, pose requirement profiles for which until now no solutions have been demonstrated in the prior art. To be mentioned here are, above all, panes that have a low weight per unit area and, at the same time, meet high thermal safety requirements, coupled with a high optical transparency, a good scratch resistance, and a good chemical resistance.

For special applications, such as, for example, those in air travel, special safety requirements need to be met and necessitate an improvement in the known composite materials. In the cabin area—for example, as panes for interior furnishing elements such as partitions or as panes for windows and doors—high thermal safety requirements are posed, such as those described in detail, for example, in the "C.F.R. (Code of Federal Regulations, Title 14, Aeronautics and Space, Chapter I Federal Aviation Administration, Department of Transportation, Part 25 Airworthiness Standards, Transport Categories Airplanes, Appendix F," or in "Environmental Conditions and Test Procedures for Airborne Equipment of the RTCA (Radio Technical Commission for Aeronautics)/DO-160G, or in the "Material Qualification Requirements Glass Materials" of Lufthansa Technik or in the corresponding regulations of the EASA (European Aviation Safety Agency), such as CS-25 ("Certification Specifications for Large Aeroplanes"). The heat release and properties such as heat resistance, flammability, burn length, flame time, drip flame time, smoke gas density, and toxicity limits with respect to smoke gases are key values for evaluating thermal safety and fire protection requirements. There are stringent provisions and narrow limits for each of these.

For the "Heat Release Rate Test for Cabin Materials" in compliance with the FAR Standard (Federal Aviation Regulation) 25.853c/d App. F Part IV, the test piece is exposed to the action of heat and surface flame treatment in a chamber during the test in a defined manner. A peak heat release rate of less than 65 kW/m$^2$ and a total heat release of less than 65 kW*min/m$^2$ within 2 minutes is required. Further requirements in regard to flammability, such as those described in FAR 25.853a App. F Part I (a)(1)(i) and determined by means of a "vertical Bunsen burner test," require a burn length of less than 152 mm, a flame time of less than 15 s, and a drip flame time, that is, the flame time of material dripping during the fire, of less than 3 s. In this test, the test piece is exposed to a defined flame (length 38 mm, Bunsen burner with an inner diameter of 10 mm) directly at the edge at a distance of 19 mm for the duration of one minute.

In addition to this, limits with respect to the weight per unit area of such interior furnishing elements have to be observed on account of requirements from the air travel industry. Mineral glass panes in known form are excluded on account of their weight per unit area for adequate strength or, when the required weight per unit area is observed, they are excluded on account of a strength that is too low or on account of their tendency to scatter shards in the event that they break, even when they meet the thermal safety requirements. Although panes made of a polymer material meet the requirements placed on the weight per unit area, they do not meet the applicable fire protection requirements. However, an improvement in flame protection for such polymer panes always entails losses in terms of the transparency of such materials, as a result of which they then cannot be used for applications as viewing windows, for example. Although known panes made of a mineral glass/polymer laminate composite do meet the requirements placed on transparency and thermal safety, they do not meet those placed on weight per unit area, such as, for example, composite glass panes as are known, for example, as windshields for motor vehicles or as composite safety glass in the field of architecture. Other mineral glass/polymer laminate composite panes, such as those described below in the listing of the prior art, do not meet the applicable fire protection requirements.

Because panes according to the prior art do not meet the applicable specifications in aircraft manufacture, special permits of the respectively competent air travel authorities apply there. Thus, at present, it is standard practice to use panes made of polycarbonate (PC) or polymethyl methacrylate (PMMA) as window elements or door elements or components of a window or of a door or as partitions. They are manufactured, for example, as extruded plates, from which the corresponding contour is then cut out, or else they are manufactured by injection molding methods, in which the contour is directly formed. For improvement of the fire protection safety, the materials can be furnished with additives. In spite of this, however, such panes do not comply in any case with all of the requirements of international provisions in regard to fire safety protection, such as, for example, those that have been established by the FAA (Federal Aviation Administration) of the United States and imposed internationally, such as, for example, the JAR ("Joint Aviation Requirements") or the CS ("Certification Specifications") of the EASA. Moreover, such panes do not have a scratch resistance that is comparable to that of glass, despite in part additional coatings with hard materials, such as those known in the prior art. Solely their low weight per unit area is advantageous. The thickness of such a PC or PMMA pane, employed in standard practice as window panes of interior furnishings in aircraft is typically about 2 mm with a weight per unit are of 2.4 kg/m² and is regarded as a reference standard for corresponding further developments or alternatives.

According to the prior art, DE 44 15 878 A1 discloses a composite glass pane that is intended for use in motor vehicles. This composite glass pane is three-layered with two glass layers, between which the plastic plate is arranged. The plastic core, which has a thickness of between 1 and 4 mm, supports the two glass layers, so that, in spite of their lesser thickness of between 0.2 and 1.5 mm, the composite glass pane has a certain strength. The glass layers are bonded to the plastic core via an elastic two-component silicone rubber with a thickness of between 0.01 and 0.5 mm, which was formed between the plastic plate and each glass layer as a stress-compensating adhesive layer. In this way, it was already possible to reduce appreciably the weight of a composite glass pane. In order to counteract external effects, such as, for example, the danger due to impact of a stone, however, it is necessary in this case to observe a minimum thickness of the glass layers and, as a result of this, the weight savings are limited. The total thickness of the proposed composite pane is theoretically 1.42 to 8.0 mm in this case. On account of the relatively thick organic layer, this composite pane does not afford any adequate fire protection safety, such as that necessitated, for example, in the requirements for air travel.

Likewise, DE 10 2009 021938 A1, in an enhancement of DE 44 15 878 A1, shows a composite glass pane, in particular for use as a motor vehicle pane or as facade cladding, composed of a plastic plate made of transparent plastic with a thickness of between 1 mm and 10 mm and composed of at least one glass layer, which is tightly bonded to the plastic plate. For further weight savings, the intermediate layer was dispensed with and the glass layer is designed to be thinner with a thickness of between 0.02 mm and 0.1 mm. Here, too, a relatively thick plastic plate is proposed, which is likewise appreciably thicker than the glass layer, so that this composite pane does not meet the thermal safety requirements, such as those demanded in the requirements for air travel, for example.

Corresponding proposals are made also by EP 0 669 205, DE 10 2010 037, and WO 2011/152380, for example. A drawback is always that the plastic layer is too thick in relation to the glass thickness. Such panes do not meet the thermal safety requirements of air travel, at least not the requirements with respect to the "heat release rate," because the heat release is always too high, thereby supporting fire, nor do they meet the requirements according to the "vertical burner test," because the proportion of organics in the composite panes is too high.

DE 20 2010 013 869 U1 shows interior furnishing elements for vehicle cabins, in particular those of aircraft. To be provided, in particular, is an improved interior furnishing element for vehicle cabins, which comprises at least a first portion, which can have a transparent plastic support substrate, on the surface of which a glass coating is applied. Such a glass coating is intended to afford an especially scratch-resistant surface as well as advantages in terms of heat resistance and flame retardancy. The glass-coated first portion can comprise a second portion—for example, a frame—which is preferably manufactured from a composite material and which is bonded to the first portion in a cohesive, form-fitting, and/or force-fitting manner. In this case, the first and the second portions can be tightly bonded to each other. Although the term "light structural element" is given in general form, the thickness of the glass coating is relatively small here, too, in comparison to the thickness of the plastic support material. The thickness of the glass coating is chosen in such a way that it is adequately stable in mechanical terms and, if need be, further requirements can be met. All in all, however, no dimensions are stated in this prior art. Because the thickness of the plastic support material is relatively greater in comparison to the thickness of the glass coating, this composite pane likewise does not meet the fire protection requirements, such as those stipulated in the requirements for air travel, for example.

SUMMARY

The object of the invention is accordingly to provide a composite element that, besides an adequately small weight per unit area, also adequately satisfies the thermal safety requirements of the current provisions ensuing from the requirements for air travel. In doing so, a reference value of 2.4 kg/m² applies as weight per unit area and reference to the FAA regulations corresponding to the "Aircraft Materials Fire Test Handbook," in particular to the "total heat release rate," applies as thermal safety requirements.

The lightweight composite pane of the invention meets the demands placed on thermal safety requirements. The lightweight composite pane meets the requirements with respect to total heat release as the most critical parameter, that is, the absolute heat release or the release of the absolute amount of heat, corresponding to the stipulations and test conditions of the FAA according to the "Aircraft Materials Fire Test Handbook," DOT/FAA/AR-00/12, Chapter 5 "Heat Release Rate Test for Cabin Materials," and has a total heat release, measured in compliance with JAR/FAR/CS 25, App. (Appendix) F, Part IV & AITM (Airbus Industries Test Method) 2.0006, of less than 65 kW×min/m², preferably of less than 50 kW×min/m², more preferably of less than 40 kW×min/m², particularly preferred of less than 20 kW×min/m².

As a further parameter with respect to the thermal safety requirements, the lightweight composite pane meets the requirements with respect to the "vertical Bunsen burner test," that is, the Bunsen burner test with a flame directed vertically on the bottom edge of the test material, corresponding to the stipulations and test conditions of the FAA according to the "Aircraft Materials Fire Test Handbook," DOT/FAA/AR-00/12, Chapter 1 "Vertical Bunsen Burner Test for Cabin and Cargo Compartment Materials," and has a flame time after removal of the flame in the test, measured in compliance with FAR/JAR/CS 25, App. F, Part I, of less than 15 s, preferably less than 8 s, more preferably less than 3 s, particularly preferred less than 1 s. Such short flame times are attained on account of a self-extinguishing behavior that is achieved by way of the structure of the lightweight composite pane of the invention. In especially preferred embodiments, flame times of down to 0 seconds are attained.

In complying with these requirements, the lightweight composite pane of the invention comprises a mineral glass or glass-ceramic layer and an organic layer A and has a weight per unit area with a lower limit of greater than or equal to 0.5 kg/m², preferably of greater than or equal to 1 kg/m², more preferably of greater than or equal to 1.3 kg/m², in particular of greater than or equal to 1.5 kg/m², in particular of greater than or equal to 1.8 kg/m², in particular of greater than or equal to 2 kg/m², and has a weight per unit area with an upper limit of less than or equal to 5.5 kg/m², preferably of less than or equal to 3 kg/m², more preferably of less than or equal to 2.5 kg/m², in particular of less than or equal to 2.3 kg/m². In further advantageous embodiments, the weight per unit area of the lightweight composite pane has a lower limit of greater than or equal to 0.6 kg/m², in particular of greater than or equal to 0.8 kg/m², greater than or equal to 0.9 kg/m², 1.1 kg/m², 1.2 kg/m², 1.4 kg/m², 1.6 kg/m², 1.7 kg/m², 1.9 kg/m², and 2.1 kg/m². In further advantageous embodiments, the weight per unit area of the lightweight composite pane has an upper limit of less than or equal to 5.5 kg/m², in particular of less than or equal to 5.0 kg/m², 4.5 kg/m², 4.0 kg/m², 3.5 kg/m², 2.8 kg/m², 2.6 kg/m², 2.4 kg/m², and 2.2 kg/m².

In an inventive way, in order to meet the thermal safety requirements, in addition to the weight per unit area, the ratio of the thickness of the mineral glass pane to the thickness of the organic layer in this case is 1:0.01 to 1:1, in particular 1:0.01 to 1:0.9, preferably 1:0.01 to 1:0.6, more preferably 1:0.01 to 1:0.3, in particular 1:0.01 to 1:0.25, particularly preferred 1:0.01 to 1:02, most preferably 1:0.01 to 1:0.15, in particular 1:0.01 to 1:0.1, and the thickness of the organic layer is less than or equal to 500 μm, in particular less than or equal to 450 μm, in particular less than or equal to 350 μm, in particular less than or equal to 300 μm, in particular less than or equal to 240 μm, preferably less than or equal to 200 μm, in particular less than or equal to 150 μm, more preferably less than or equal to 100 μm, in particular less than or equal to 80 μm, most preferably less than or equal to 70 μm, in particular less than or equal to 50 μm, and in particular less than or equal to 30 μm, in particular less than or equal to 25 μm.

In order to observe the thermal safety requirements, in particular in regard to the total heat release and the flame time in the "vertical Bunsen burner test" or the "Bunsen burner test," on the one hand, the absolute amount of heat released by the proportion of organics in the lightweight composite pane, which are combustible, is crucial, for which reason the thickness of the organic layer is limited in an inventive way for the given weights per unit area. However, on the other hand, not only the absolute amount of heat-releasing or combustible organics is crucial, but, within the given weights per unit area, the ratio between noncombustible mineral glass or glass ceramic and the total proportion of organics in such a lightweight composite pane is also of crucial importance in order to meet the thermal safety requirements. How much of the heat capacity is supplied on the part of the glass or glass ceramic in a lightweight composite pane and thus how much heat can be absorbed by the glass or glass ceramic within the limit of the weight per unit area for the lightweight composite pane play a role here.

In order to also be able to employ such lightweight composite panes economically for various applications, above all in the fields of transportation and architecture, but also to place a limit on the absolute proportion of organics in regard to the fire protection requirements, the lightweight composite pane of the invention is also characterized by the given weights per unit area, with observation of the given ratio limits between noncombustible glass or glass ceramic and the proportion of organics.

For many applications, the optical properties, in particular the transparency of the lightweight composite pane, are a key feature. Included here are window or door elements or components of a window or of a door, partitions, or also smoke gas barrier elements, so-called smoke barriers, in the field of architecture or as furnishing elements for vehicle cabins in the field of transportation—for example, interior window panes in an aircraft or glazing in an electric vehicle. Especially where the weight per unit area assumes a decisive role, attempts to adapt light materials to the thermal safety requirements have so far failed owing to the quality of the optical properties. Any marked improvement in the thermal properties of polymeric materials in the direction of flame retardancy or in terms of flammability has always occurred at the expense of transparency in an unacceptable manner.

Transparency is understood to be the property of a layer, of a pane, or of a composite pane with a transmittance of greater than or equal to 80 percent in the visible wavelength range of light of 380 nm to 900 nm, in particular of 420 nm to 800 nm.

The inventors have succeeded in providing a lightweight composite pane that is compatible with the requirements placed on the optical properties for a viewing pane for the various fields of application, while observing the above-mentioned thermal safety requirements and the given low weight per unit area. Thus, the transparency of the lightweight composite pane in each of the preferred embodiments is greater than 80%, preferably greater than 85%, more preferably greater than 88%, particularly preferred greater than 90%. The transparency of the lightweight composite pane can even be greater than 91% in these cases. In an inventive way, the mineral glass or glass-ceramic layer has a corresponding transparency and the transparency of the organic layer is in part even higher in this case, also on account of its limited layer thickness.

In addition, in the preferred embodiment of the lightweight composite pane with good optical properties, however, an outstanding absence of streaks, low haze or low scattering behavior, no distortions, and a neutral rendition of colors (corresponding to the color rendering index DIN EN 410) are afforded. Here, too, the ratio of the total thickness of the one or more mineral glass or glass-ceramic panes to the thickness of the organic layer is of advantage. Thus, the optical scattering behavior (haze) of the lightweight composite pane is less than or equal to 1.5%, preferably less than or equal to 1.0%, more preferably less than or equal to 0.5%, measured with a HazeGard, measurement according to ASTM D1003 D1044). The color rendering index of the lightweight composite pane according to DIN EN 410 is greater than or equal to 95, preferably greater than or equal to 98, more preferably greater than or equal to 99.

The base support plate of the lightweight composite pane of the invention is a mineral glass pane or a glass ceramic, with the thickness of the one glass or glass-ceramic pane being less than or equal to 1 mm, preferably less than or equal to 0.8 mm, more preferably less than or equal to 0.6 mm, and greater than or equal to 200 μm, preferably greater than or equal to 350 μm, more preferably greater than or equal to 450 μm, particularly preferred greater than or equal to 500 μm, in particular greater than or equal to 530 μm. Advantageous thicknesses are 0.2 mm, 0.21 mm, 0.3 mm, 0.4 mm, 0.55 mm, 0.7 mm, 0.9 or 1.0 mm.

Preferably used in this case is a glass or a glass ceramic that is prestressed for its use. This glass or this glass ceramic can be prestressed chemically by ion exchange or thermally or by a combination of thermal and chemical methods.

The mineral glass pane is composed preferably of a lithium aluminum silicate glass, a soda-lime silicate glass, a borosilicate glass, an alkali aluminosilicate glass, or an alkali-free or low-alkali aluminosilicate glass. Such glasses are obtained, for example, by means of drawing methods, such as a down-draw method, by means of overflow fusion, or by means of float technology.

Advantageously, a low-iron or iron-free glass, in particular one with an $Fe_2O_3$ content of less than 0.05 wt %, preferably less than 0.03 wt %, can be used, because it exhibits reduced absorption and thus makes possible, in particular, an increased transparency.

For other applications, however, gray glasses or colored glasses are also preferred. An optical glass can also serve as base support material, such as, for example, a heavy flint glass, a lanthanum heavy flint glass, a flint glass, a light flint glass, a crown glass, a borosilicate crown glass, a barium crown glass, a heavy crown glass, or a fluorine crown glass.

Preferably used as support material are lithium aluminum silicate glasses of the following compositions, composed of (in wt %):

| | |
|---|---|
| $SiO_2$ | 55-69 |
| $Al_2O_3$ | 19-25 |
| $Li_2O$ | 3-5 |
| Total $Na_2O + K_2O$ | 0-3 |
| Total $MgO + CaO + SrO + BaO$ | 0-5 |
| $ZnO$ | 0-4 |
| $TiO_2$ | 0-5 |
| $ZrO_2$ | 0-3 |
| Total $TiO_2 + ZrO_2 + SnO_2$ | 2-6 |
| $P_2O_5$ | 0-8 |
| F | 0-1 |
| $B_2O_3$ | 0-2, | as well as, if need be, additions of coloring oxides, such as, for example, $Nd_2O_3$, $Fe_2O_3$, CoO, NiO, $V_2O_5$, $Nd_2O_3$, $MnO_2$, $TiO_2$, CuO, $CeO_2$, $Cr_2O_3$, rare earth oxides in contents of 0-1 wt %, as well as refining agents, such as $As_2O_3$, $Sb_2O_3$, $SnO_2$, $SO_3$, Cl, F, $CeO_2$ of 0-2 wt %.

Further preferably used as support material are soda-lime silicate glasses of the following glass compositions, composed of (in wt %):

| | |
|---|---|
| $SiO_2$ | 40-80 |
| $Al_2O_3$ | 0-6 |
| $B_2O_3$ | 0-5 |
| Total $Li_2O + Na_2O + K_2O$ | 5-30 |
| Total $MgO + CaO + SrO + BaO + ZnO$ | 5-30 |
| Total $TiO_2 + ZrO_2$ | 0-7 |
| $P_2O_5$ | 0-2, | as well as, if need be, additions of coloring oxides, such as, for example, $Nd_2O_3$, $Fe_2O_3$, CoO, NiO, $V_2O_5$, $Nd_2O_3$, $MnO_2$, $TiO_2$, CuO, $CeO_2$, $Cr_2O_3$, rare earth oxides in contents of 0-5 wt % or, for "black glass," of 0-15 wt %, as well as refining agents, such as $As_2O_3$, $Sb_2O_3$, $SnO_2$, $SO_3$, Cl, F, $CeO_2$ of 0-2 wt %.

Further preferably used as support material are borosilicate glasses of the following glass compositions, composed of (in wt %):

| | |
|---|---|
| $SiO_2$ | 60-85 |
| $Al_2O_3$ | 1-10 |
| $B_2O_3$ | 5-20 |
| Total $Li_2O + Na_2O + K_2O$ | 2-16 |
| Total $MgO + CaO + SrO + BaO + ZnO$ | 0-15 |
| Total $TiO_2 + ZrO_2$ | 0-5 |
| $P_2O_5$ | 0-2, | as well as, if need be, additions of coloring oxides, such as, for example, $Nd_2O_3$, $Fe_2O_3$, CoO, NiO, $V_2O_5$, $Nd_2O_3$, $MnO_2$, $TiO_2$, CuO, $CeO_2$, $Cr_2O_3$, rare earth oxides in contents of 0-5 wt % or, for "black glass," of 0-15 wt %, as well as refining agents, such as $As_2O_3$, $Sb_2O_3$, $SnO_2$, $SO_3$, Cl, F, $CeO_2$ of 0-2 wt %.

Further preferably used as support materials are alkali aluminosilicate glasses of the following glass compositions, composed of (in wt %):

| | |
|---|---|
| $SiO_2$ | 40-75 |
| $Al_2O_3$ | 10-30 |
| $B_2O_3$ | 0-20 |
| Total $Li_2O + Na_2O + K_2O$ | 4-30 |
| Total $MgO + CaO + SrO + BaO + ZnO$ | 0-15 |
| Total $TiO_2 + ZrO_2$ | 0-15 |
| $P_2O_5$ | 0-10, | as well as, if need be, additions of coloring oxides, such as, for example, $Nd_2O_3$, $Fe_2O_3$, CoO, NiO, $V_2O_5$, $Nd_2O_3$, $MnO_2$, $TiO_2$, CuO, $CeO_2$, $Cr_2O_3$, rare earth oxides in contents of 0-5 wt % or, for "black glass," of 0-15 wt %, as well as refining agents, such as $As_2O_3$, $Sb_2O_3$, $SnO_2$, $SO_3$, Cl, F, $CeO_2$ of 0-2 wt %.

Further preferably used as support material are alkali-free aluminosilicate glasses of the following glass compositions, composed of (in wt %):

| | |
|---|---|
| $SiO_2$ | 50-75 |
| $Al_2O_3$ | 7-25 |
| $B_2O_3$ | 0-20 |
| Total $Li_2O + Na_2O + K_2O$ | 0-0.1 |
| Total $MgO + CaO + SrO + BaO + ZnO$ | 5-25 |
| Total $TiO_2 + ZrO_2$ | 0-10 |
| $P_2O_5$ | 0-5, | as well as, if need be, additions of coloring oxides, such as, for example, $Nd_2O_3$, $Fe_2O_3$, CoO, NiO, $V_2O_5$, $Nd_2O_3$, $MnO_2$, $TiO_2$, CuO, $CeO_2$, $Cr_2O_3$, rare earth oxides in contents of 0-5 wt % or, for "black glass," of 0-15 wt %, as well as refining agents, such as $As_2O_3$, $Sb_2O_3$, $SnO_2$, $SO_3$, Cl, F, $CeO_2$ of 0-2 wt %.

Further preferably used as support material are alkali-poor aluminosilicate glasses of the following glass compositions, composed of (in wt %):

| | |
|---|---|
| $SiO_2$ | 50-75 |
| $Al_2O_3$ | 7-25 |
| $B_2O_3$ | 0-20 |
| Total $Li_2O + Na_2O + K_2O$ | 0-4 |
| Total $MgO + CaO + SrO + BaO + ZnO$: | 5-25 |
| Total $TiO_2 + ZrO_2$ | 0-10 |
| $P_2O_5$ | 0-5, | as well as, if need be, additions of coloring oxides, such as, for example, $Nd_2O_3$, $Fe_2O_3$, CoO, NiO, $V_2O_5$, $Nd_2O_3$, $MnO_2$, $TiO_2$, CuO, $CeO_2$, $Cr_2O_3$, rare earth oxides in contents of 0-5 wt % or, for "black glass," of 0-15 wt %, as well as refining agents, such as $As_2O_3$, $Sb_2O_3$, $SnO_2$, $SO_3$, Cl, F, $CeO_2$ of 0-2 wt %.

Especially preferred are, for example, thin glasses, such as those marketed by Schott A G, Mainz under the trade names D263, D263 eco, B270, B270 eco, Borofloat, Xensation Cover, Xensation Cover 3D, AF45, AF37, AF32, or AF32 eco.

In another embodiment, the pane is a mineral glass ceramic, with the mineral glass-ceramic pane composed of a ceramicized aluminosilicate glass or lithium aluminosilicate glass, in particular one made of a chemically and/or thermally hardened ceramicized aluminosilicate glass or lithium aluminosilicate glass. In another embodiment, the pane is composed of a ceramizable starting glass, which, in the event of a fire, is ceramicized or further progressively ceramicized under the effect of heat and, as a result, affords an increased fire protection safety.

Preferably used is a glass ceramic or a ceramizable glass having the following composition of the starting glass (in wt %):

| | |
|---|---|
| $Li_2O$ | 3.2-5.0 |
| $Na_2O$ | 0-1.5 |
| $K_2O$ | 0-1.5 |
| Total $Na_2O + K_2O$ | 0.2-2.0 |
| MgO | 0.1-2.2 |
| CaO | 0-1.5 |
| SrO | 0-1.5 |
| BaO | 0-2.5 |
| ZnO | 0-1.5 |
| $Al_2O_3$ | 19-25 |
| $SiO_2$ | 55-69 |
| $TiO_2$ | 1.0-5.0 |
| $ZrO_2$ | 1.0-2.5 |
| $SnO_2$ | 0-1.0 |
| Total $TiO_2 + ZrO_2 + SnO_2$ | 2.5-5.0 |
| $P_2O_5$ | 0-3.0. |

In another embodiment, a glass ceramic or a ceramizable glass having the following composition of the starting glass is preferably used (in wt %):

| | |
|---|---|
| $Li_2O$ | 3-5 |
| $Na_2O$ | 0-1.5 |
| $K_2O$ | 0-1.5 |
| Total $Na_2O + K_2O$ | 0.2-2 |
| MgO | 0.1-2.5 |
| CaO | 0-2 |
| SrO | 0-2 |
| BaO | 0-3 |
| ZnO | 0-1.5 |
| $Al_2O_3$ | 15-25 |
| $SiO_2$ | 50-75 |
| $TiO_2$ | 1-5 |
| $ZrO_2$ | 1-2.5 |
| $SnO_2$ | 0-1.0 |
| Total $TiO_2 + ZrO_2 + SnO_2$ | 2.5-5 |
| $P_2O_5$ | 0-3.0. |

In another embodiment, a glass ceramic or a ceramizable glass having the following composition of the starting glass is preferably used (in wt %):

| | |
|---|---|
| $Li_2O$ | 3-4.5 |
| $Na_2O$ | 0-1.5 |
| $K_2O$ | 0-1.5 |
| Total $Na_2O + K_2O$ | 0.2-2 |
| MgO | 0-2 |
| CaO | 0-1.5 |
| SrO | 0-1.5 |
| BaO | 0-2.5 |
| ZnO | 0-2.5 |
| $B_2O_3$ | 0-1 |
| $Al_2O_3$ | 19-25 |
| $SiO_2$ | 55-69 |
| $TiO_2$ | 1.4-2.7 |
| $ZrO_2$ | 1.3-2.5 |
| $SnO_2$ | 0-0.4 |
| Total $TiO_2 + SnO_2$ | less than 2.7 |
| $P_2O_5$ | 0-3 |
| Total $ZrO_2 + 0.87 (TiO_2 + SnO_2)$ | 3.6-4.3. |

For a transparency of the at least one glass-ceramic pane of >80%, the content of $TiO_2$ is more preferably less than 2 wt % of the content of $SnO_2$, more preferably less than 0.5 wt %, and the content of $Fe_2O_3$ is more preferably less than 200 ppm.

The at least one glass ceramic preferably contains high-quartz mixed crystals or keatite mixed crystals as predominant crystal phase. The crystallite sizes are advantageously smaller than 70 nm, more preferably smaller than exactly 50 nm, most preferably smaller than exactly 10 nm.

In this preferred embodiment of the invention, in order to improve above all the fracture strength and the scratch resistance of the mineral glass or glass-ceramic pane, it is prestressed chemically and/or thermally. In particular for the special application as an interior furnishing element in air travel, such as, for example, as an interior window pane, such a lightweight composite pane has to withstand an "abuse load test" or a "ball drop test," such as the one given, for example, in the "Lufthansa Technik Material Qualification Requirements." This needs to be observed for a lightweight composite pane of the invention when it has been prestressed thermally and/or chemically, while limiting the thickness of a glass or glass-ceramic pane.

Known are thermal and chemical prestressing processes. In thermal prestressing processes, the entire glass object is heated and then the glass surface is quenched by blowing cold air rapidly against it. As a result, the surface solidifies immediately, whereas the interior of the glass further contracts. This results in a tensile stress in the interior and a compressive stress correspondingly on the surface. Usually, however, thermal prestressing processes are less suitable for thin glasses with a thickness of less than 1 mm or 0.5 mm.

In an embodiment of the invention, the glass or glass-ceramic pane is advantageously prestressed thermally prior to a chemical prestressing.

The invention relates more preferably to an embodiment of the glass or glass-ceramic pane as a chemically prestressed substrate. The chemical prestressing can occur in one stage or else in multiple stages. In particular, alkali- or lithium-containing glasses or glass ceramics in which sodium ions are replaced by potassium ions or lithium ions by sodium ions are used. The replacement of smaller ions by larger ions in this way in the surface of the glass or glass-ceramic pane creates a compressive stress. The ion exchange occurs, for example, in a corresponding salt bath, such as $KNO_3$ or $NaNO_3$ or $AgNO_3$ or any desired mixture of these salts or in a multistage process using $KNO_3$ and/or $NaNO_3$ and/or $AgNO_3$. The prestressing temperatures in this case are in the range of 350° to 490° with a prestressing time of 1 to 16 hours. The ion exchange in an $AgNO_3$ salt bath occurs, in particular, by inclusion of silver ions in order to design the surface to be antibacterial.

In the embodiment of the invention with a one-stage chemically prestressed glass or glass-ceramic pane, the compressive stress on the surface is at least 600 MPa, preferably at least 800 MPa, for a penetration depth of the exchanged ions of greater than or equal to 30 µm, preferably greater than or equal to 40 µm.

In the embodiment of the invention with a multistage chemically prestressed glass or glass-ceramic pane, the compressive stress on the surface can be less, whereby, however, in the multistage prestressing, the penetration depth of the exchanged ions is increased, so that the strength of the prestressed glass or of the prestressed glass ceramic can be higher overall. In particular, the compressive stress on the surface of the glass or glass-ceramic pane can be at least 500 MPa for a penetration depth of greater than or equal to 50 µm and particularly preferred greater than or equal to 80 µm. For multistage prestressing, the penetration depth can even be greater than 100 µm.

The ion-exchange depth of a chemical hardening for a glass or glass-ceramic pane in a lightweight composite pane is greater than or equal to 30 µm, preferably greater than or equal to 40 µm, more preferably greater than or equal to 50 µm, particularly preferred greater than or equal to 80 µm, and the surface compressive stress of a glass or glass-ceramic pane in a lightweight composite pane is greater than or equal to 500 MPa, preferably greater than or equal to 600 MPa, more preferably greater than or equal to 700 MPa, particularly preferred greater than or equal to 800 MPa, particularly preferred greater than 900 MPa.

The penetration depth of the exchanged ions and thus the surface zones of a higher compressive stress in the glass or glass-ceramic pane increase the strength of the glass or glass-ceramic pane. However, in each case, the penetration depth needs to be tuned to the total thickness of the glass or glass-ceramic pane, since, if the tensile stress that is created in the interior of the glass or glass-ceramic pane during chemical hardening is too high, the glass or glass-ceramic pane will break. When the glass or glass-ceramic pane is subjected to bending through the action of an external force, the pane responds more sensitively owing to its internal tensile stress. The interior tensile stress for the glass or glass-ceramic pane is therefore less than or equal to 50 MPa, preferably less than or equal to 30 MPa, more preferably less than or equal to 20 MPa, particularly preferred less than or equal to 15 MPa. The surface compressive stress of the glass or glass-ceramic pane is greater than or equal to 500 MPa, preferably greater than or equal to 600 MPa, preferably greater than or equal to 700 MPa, more preferably greater than or equal to 800 MPa, in particular greater than or equal to 900 MPa.

The 4-point bending strength in compliance with DIN EN 843-1 or DIN EN 1288-3 of the glass or glass-ceramic pane in a lightweight composite pane is greater than or equal to 550 MPa, preferably greater than or equal to 650 MPa, more preferably greater than or equal to 800 MPa.

The Young modulus or modulus of elasticity of the glass or glass-ceramic pane in a lightweight composite pane is greater than or equal to 68 GPa, preferably greater than or equal to 73 GPa, more preferably greater than or equal to 74 GPa, particularly preferred greater than or equal to 80 GPa.

The shear modulus of the glass or glass-ceramic pane in a lightweight composite pane is greater than or equal to 25 GPa, preferably greater than or equal to 29 GPa, more preferably greater than or equal to 30 GPa, particularly preferred greater than or equal to 33 GPa.

Above all, a prestressed glass or glass-ceramic pane has a high surface hardness and affords a high resistance against scratching and scoring due to the action of external force. In compliance with DIN EN 843-4 or EN ISO 6507-1, the Vickers hardness of a non-prestressed mineral glass or glass-ceramic pane or of the glass or glass-ceramic pane in a non-prestressed state is greater than or equal to 500 HV 2/20, preferably greater than or equal to 560 HV 2/20, more preferably greater than or equal to 610 HV 2/20, or the Vickers hardness of the mineral glass or glass-ceramic pane in a prestressed state is greater than or equal to 550 HV 2/20, preferably greater than or equal to 600 HV 2/20, more preferably greater than or equal to 650 HV 2/20, particularly preferred greater than or equal to 680 HV 2/20 for a test force of 2 N (corresponding to a weight of 200 g).

The use of a glass or glass-ceramic pane as an outer layer for a lightweight composite pane has, besides the aspects of fire protection safety and scratch resistance, also the advantage of a good chemical resistance, in particular towards cleaning agents. This ensures that a diverse variety of cleaning agents can be used without any limitation and it ensures the long-term stability of the surface quality and optical properties in spite of a high number of cleaning cycles.

The glass or glass-ceramic pane in a lightweight composite pane has a transparency of greater than 80%, preferably greater than 85%, more preferably greater than 88%, particularly preferred greater than 90%. However, it can even have a transparency of greater than 91%.

The lightweight composite pane according to the invention is intended to ensure a high degree of protection against shards in the event of breakage; that is, no shards are to be scattered into the surroundings. For this reason, the glass pane is combined with an organic layer, with observation of the thermal safety requirements. This layer is provided, above all, as a shard protection layer, which, in the event of breakage, holds together and tightly retains the broken pieces of the glass pane and which, moreover, increases the elasticity and reliability of the lightweight composite pane.

The thickness of the organic layer, taking into consideration the weight per unit area of the lightweight composite pane and the ratio of the thickness of the mineral glass pane to the thickness of the organic layer is less than or equal to 500 μm, in particular less than or equal to 450 μm, in particular less than or equal to 350 μm, in particular less than or equal to 300 μm, in particular less than or equal to 240 μm, preferably less than or equal to 200 μm, in particular less than or equal to 150 μm, more preferably less than or equal to 100 μm, in particular less than or equal to 80 μm, most preferably less than or equal to 70 μm, in particular less than or equal to 50 μm, and in particular less than or equal to 30 μm, in particular less than or equal to 25 μm.

The transparency of the organic layer is greater than 80%, preferably greater than or equal to 85%, more preferably greater than or equal to 88%, particularly preferred greater than or equal to 90%, and, owing to the organic layer, the haze of the lightweight composite pane (haze, measured with a HazeGard, measurement in compliance with ASTM D1003 D1044) increases by less than 1% (absolute haze). The polymer for the organic layer is chosen correspondingly.

In order to ensure the optical quality of the lightweight composite pane for viewing windows, the difference of the refractive index of the glass or glass-ceramic pane and the organic layer is less than or equal to 0.3, preferably less than or equal to 0.25, more preferably less than or equal to 0.2, particularly preferred less than or equal to 0.15.

Furthermore, the optical retardation of the organic layer is no greater than 20 nm and preferably less than 15 nm.

In order for the optical properties and the use properties of the lightweight composite pane to be high, limits are observed in regard to the surface waviness and surface roughness as well as the elasticity of the organic layer.

Thus, the outward-facing surface of the organic layer in the lightweight composite pane has a high surface quality and, on its surface, a waviness of less than or equal to 100 nm, preferably less than or equal to 80 nm, more preferably less than or equal to 50 nm, and a roughness $R_T$ of less than or equal to 30 nm, preferably less than or equal to 20 nm, more preferably less than or equal to 10 nm.

Furthermore, the streak, that is, the formation and size of streaks in the organic layer, is less than 100 nm, preferably less than or equal to 50 nm, more preferably less than or equal to 30 nm.

The roughness $R_T$, also referred to as the surface roughness, is determined in compliance with DIN 4762 Part 1-08.60 and corresponds to the maximum distance between a profile peak and profile valley of a reference track. It should not be confused with the roughness $R_A$, which corresponds to the arithmetic mean of all distances and is usually only a fraction of $R_T$. The roughness describes the short-wave portion of the deviation from an ideally flat surface. The waviness (measured in compliance with DIN/ 15011562 with a cut-off of 0.8 to 8.0 mm and a 2CRPC 50 filter) describes the mean wavelength portion of the deviation from an ideally flat surface. The waviness is determined over a measuring track of 20 mm. The streak is measured using the same instrument parameters as the waviness; the evaluation measurement track is 2 mm.

In order to make the lightweight composite pane less sensitive to point loads, such as, for example, impacts with sharp objects, it has proven advantageous to choose the polymer for the organic layer in such a way that its modulus of elasticity is less than 5 GPa, preferably less than 2.6 GPa, most preferably less than 1.5 GPa. The stress load that occurs is distributed onto a larger area by way of the organic layer and appreciably reduced. The modulus of elasticity of very thin plastic can be determined from force penetration depth measurements. To this end, a test piece of defined geometry, in general a pyramidally created diamond, is pressed into the surface with increasing load and then the load is released. The modulus of elasticity is obtained from the slope of the load-release lines (penetration depth versus load). The measurements are carried out using a so-called picoindenter, by means of which very small indent depths of between 10 and 100 nm can be realized. This is necessary because, when the penetration depth exceeds approximately 10% of the layer thickness, the substrate begins to influence the measurement.

The organic layer is composed of a duroplastic reaction resin that can be hardened and creates a permanent, viscous-elastic and clear transparent adhesion to the glass for enhancing the shard protection. The organic layer is composed preferably of a polymer of the group of phenoplasts, such as phenol formaldehyde resins, aminoplasts such as urea formaldehyde resins or melamine formaldehyde resins, epoxide resins, unsaturated polyester resins, vinyl ester resins (phenacrylate resins), diallyl phthalate resins, silicone resins, or cross-linking polyurethane resins. Especially suitable are, in particular, polymethacrylate and polyacrylate reaction resins.

The organic layer can contain, in addition, fillers and other necessary additives in order to adapt the lightweight composite pane to special requirements.

In a preferred embodiment, in order to ensure good optical properties of the lightweight composite pane for certain applications, such as, for example, viewing windows for vehicle cabins, the refractive values of the glass or glass-ceramic pane and of the organic layer are tuned to each other. The difference in the refractive index is less than or equal to 0.3, preferably less than or equal to 0.25, more preferably less than or equal to 0.2, particularly preferred less than or equal to 0.15. Thus, for example, typical refractive indexes for the glass or glass-ceramic pane are 1.502 (at 780 nm), 1.506 (at 633 nm), 1.508 (at 588 nm) for an aluminosilicate glass or, in its compressive stress layer after chemical prestressing, 1.510 (at 780 nm), 1.514 (at 633 nm), 1.516 (at 588 nm) or, for a borosilicate glass, 1.523 (at 588 nm) or, for an alkali-free aluminosilicate glass, 1.510 (at 588 nm) or, for a soda-lime glass, 1.52 (at 588 nm). The refractive index of the organic layer as PMMA (polymethyl methacrylate), for example, is 1.49 as reference value, or as polyacrylate, for example, 1.48 as reference value.

For the determination of the thickness of the individual layers in a lightweight pane according to the invention, with observation of the ratio of the thickness of the glass or glass-ceramic pane to the thickness of the organic layer, the following reference values are given, for example: for an aluminosilicate glass, a density of 2.39 to 2.48 g/cm$^3$; for a borosilicate glass, a density of 2.51 g/cm$^3$; for an alkali-free aluminosilicate glass, a density of 2.43 g/cm$^3$; for a soda-lime glass, a density of 2.5 g/cm$^3$; for a lithium aluminosilicate glass ceramic, a density of 2.5 g/cm$^3$; for an organic layer as PMMA, a density of 1.19 g/cm$^3$, as silicone resin, for example, a density of 0.98 to 1.07 g/cm$^3$, as polyacrylate, for example, a reference value of 1.3 to 1.6, for example.

The invention also includes a method for the manufacture of such a lightweight composite pane. In order to manufacture a lightweight composite pane, the glass or glass-ceramic pane must itself first be manufactured and supplied. In order to manufacture a glass or glass-ceramic pane having the required surface quality, this manufacture should occur in a down-draw process, in an overflow fusion process, or in a float method. Preferably, the glass or glass-ceramic pane is hardened prior to the coating thereof, in particular chemically prestressed. The surface quality of the glass or glass-ceramic pane is a prerequisite for obtaining an appropriate surface quality on the polymer side of the lightweight composite pane. After the glass or glass-ceramic pane has been manufactured, it can either be directly further processed or, if the steps of pretreatment of the glass or glass-ceramic pane surface and application of the organic layer are spatially separate from the manufacture of the glass or glass-ceramic pane, it can be first cut into pieces, which is preferred in the manufacture of smaller and more intermediate quantities. The pretreatment of the glass or glass-ceramic pane surface occurs in order to ensure a good adhesion of the organic layer.

When the organic layer is applied to the glass or glass-ceramic surface and, namely, is done so in the liquid phase, the viscosity of the reaction resin is adjusted in such a way that an excellent surface quality of the organic layer is present after the hardening thereof. Furthermore, in order to obtain good optical properties, the cast of the organic layer is performed in such a way that an organic layer free of bubbles is present in the lightweight composite pane.

The application in the liquid phase onto the solid glass or glass-ceramic pane ensures, moreover, that no retardation direction is created in the organic layer and hence the optical rotation of the organic layer and thus that of the lightweight composite pane is less than 20 nm.

If the manufacture of the glass pane as well as the pretreatment and coating are planned as continuous processes, then the glass or glass-ceramic pane coated with the organic layer is cut into pieces after the coating process.

If the glass or glass-ceramic pane has been cut into pieces prior to coating and if it is desired to obtain extremely thin organic layers, the coating occurs preferably by spinning or spray spinning. Coating methods that are also suitable for a continuous process are casting, rolling, and spraying.

Advantageous in regard to the properties of the lightweight composite pane to be manufactured is the use of glass or glass-ceramic panes of less than or equal to 1 mm, preferably less than or equal to 0.8 mm, more preferably less than or equal to 0.6 mm, and greater than or equal to 200 µm, preferably greater than or equal to 350 µm, more preferably greater than or equal to 450 µm, particularly preferred greater than or equal to 500 µm, in particular greater than or equal to 530 µm, and the application of polymer layers of less than or equal to 500 µm, in particular less than or equal to 450 µm, in particular less than or equal to 350 µm, in particular less than or equal to 300 µm, in particular less than or equal to 240 µm, preferably less than or equal to 200 µm, in particular less than or equal to 150 µm, more preferably less than or equal to 100 µm, in particular less than or equal to 80 µm, most preferably less than or equal to 70 µm, in particular less than or equal to 50 µm, and in particular less than or equal to 30 µm, in particular less than or equal to 25 µm.

In order to increase the adhesion of the organic layer to the glass or glass-ceramic pane, the best results are obtained by surface treatment prior to the coating by means of a method such as UV irradiation of the glass pane surface in an ozone-containing atmosphere, by corona treatment, by flame pyrolysis, by flame treatment, and/or by plasma treatment or by means of a combination of at least two of the treatments mentioned.

For assisting the hardening of the organic layer, the applied organic layer should be hardened preferably by use of one of the following means: heat, UV irradiation, IR irradiation, microwaves, and/or electron-beam crosslinking or a combination of at least two of these means. Of further assistance is a vacuum method and/or a RIM (reaction injection molding) method or a combination of at least two of the means mentioned.

The invention further also includes the use of such a lightweight composite pane. In particular, such a lightweight composite pane is suitable as a furnishing element for vehicle cabins in the field of transportation, in particular for vehicle cabins of an aircraft or an electric vehicle, but also for applications in boats or other means of transportation. In comparison to the panes known in prior art, the lightweight composite panes according to the invention enable applications where, besides a low weight per unit area, a high scratch resistance, a high surface hardness, a high surface quality, a good chemical resistance toward cleaning agents, and very good fire protection properties, such as flammability, flame retardancy, or smoke barriers, are crucial, depending on the respective embodiments as described above.

In the especially preferred embodiment with a low weight per unit area, a high scratch resistance, a high surface hardness, a good chemical resistance toward cleaning agents, and, still further, a high optical transparency and very good optical properties, such as, for example, the absence of streaks and a very low haze, as described respectively above, combined with compliance with the required properties of high fire protection, the lightweight composite pane according to the invention enables applications as a window or door element or a component of a window or of a door or as a partition or as a table element or component of a table, such as, for example, a folding table in the area of air travel, where especially stringent requirements are posed. Through meeting all of these requirements, as established in the official guidelines and regulations, such as those of the FAA, RTCA, EASA, or the specifications of aircraft manufacturers, the use as furnishing element for an aircraft is afforded. On account of the low weight per unit area in conjunction with all of the good properties, the invention relates also to the use as a furnishing element for vehicle cabins in the field of transportation, in particular, in addition to vehicle cabins for an aircraft, also those for an electric vehicle. In the process, the invention relates above all to the use as a window or door element or as a component of a window or of a door or as a partition or as a table element. Partitions are employed in order to separate certain passenger areas from one another. As a table element, the lightweight composite pane can be a component of a folding table, such as one commonly used in aircraft.

Of special advantage is the use of the lightweight composite pane as an interior window pane of an aircraft or electric vehicle. In the event a fire, there is no danger of accelerating the fire and no associated danger to a passenger arising from the pane.

The invention also comprises an interior aircraft window pane or lightweight window pane with a lightweight composite pane according to the invention in accordance with one of the above embodiments or in accordance with a combination thereof.

The invention further comprises the use of a lightweight composite pane as a fire protection lightweight component in the field of architecture, in particular as a smoke barrier element, partition, a window element, a door element, a wall element, or a ceiling element, or as a component of a window, a door, a wall, or a ceiling, as a showcase pane, or as a component of a piece of furniture.

The invention also comprises a smoke barrier element with a lightweight composite pane according to the invention in accordance with one of the preceding embodiments or in accordance with a combination thereof. Such lightweight composite panes according to the invention as smoke barrier elements are mounted vertically 20 to 100 cm, for example, suspended from the ceiling in order to impede any spread or transmission of smoke in a room in the event of fire. A danger in the event of fires often ensues from the spread of smoke in buildings, entailing the danger of smoke poisoning for persons. Such fire-protection-safe, lightweight smoke barrier elements enable the time for danger-free evacuation in the case of fire to be markedly prolonged. Owing to the low weight of the lightweight composite panes and the high fire protection thereof, it is possible to provide a solution with less static load of the construction and hence lower costs.

BRIEF DESCRIPTION OF THE DRAWINGS

The sole FIGURE shows the structure of a lightweight composite pane.

DETAILED DESCRIPTION

The invention shall be explained in detail by way of the following examples.

The FIGURE shows the structure of a lightweight composite pane 1. The base support substrate is formed by a first glass pane 11 made of a chemically prestressed aluminosilicate glass, such as the one offered by the company Schott A G/Mainz under the trade name Xensation®, which has a thickness of 0.55 mm and a density of 2.48 g/cm$^3$; as the organic layer A 21, a polymethyl methacrylate with a thickness of 150 µm and a density of 1.19 g/cm$^3$, was used. There resulted a weight per unit area of 1.54 kg/m$^2$ and hence a weight savings of 35% in comparison to a standard window pane made of pure PC or PMMA in an aircraft interior cabin with 2.4 kg/cm$^2$ as reference value. The ratio of the thickness of the glass pane to the thickness of the organic layer was 1:0.273. This lightweight composite pane 1 passed the Bunsen burner test, which was carried out in compliance with the provisions and regulations of FAR/JAR/CS 25, App. F, Part I & AITM 2.0002A. And they passed the heat release test. This test was carried out in compliance with the provisions and regulations of FAR/JAR/CS 25, App. F, Part IV & AITM 2.0006.

The following Examples 2 and 3 show alternative embodiments of a lightweight composite pane, corresponding to the embodiment of FIG. 1, that passed the Bunsen burner test and the heat release test.

EXAMPLE 2

| Material | | Thickness |
|---|---|---|
| Glass layer | Chemically prestressed aluminosilicate glass | 1.0 mm |
| Organic layer | Polyurethane with flame-retarding additive, applied in the RIM method | 200 μm |

Weight per unit area: 2.72 kg/m².
Ratio of the thickness of the glass pane to the total thickness of the organic layer:
1:0.200.

EXAMPLE 3

| Material | | Thickness |
|---|---|---|
| Glass layer | Chemically prestressed aluminosilicate glass | 0.2 mm |
| Organic layer | Silicone resin | 100 μm |

Weight per unit area: 0.60 kg/m².
Ratio of the thickness of the glass pane to the total thickness of the organic layer: 1:0.500

LIST OF REFERENCE NUMBERS

| 1 | Lightweight composite pane |
|---|---|
| 11 | Glass pane |
| 21 | Organic layer |

What is claimed is:

1. A lightweight composite pane for viewing windows, comprising:
    a mineral glass pane, wherein the mineral glass pane is prestressed and has a glass pane refractive index;
    an organic layer adjacent the mineral glass pane, wherein organic layer has an organic layer refractive index;
    a weight per unit area having a lower limit of 0.5 kg/m² and an upper limit of 5.5 kg/m²;
    a ratio of a thickness of the mineral glass pane to a thickness of the layer is 1:0.01 to 1:1, wherein the thickness of the layer is less than or equal to 450 μm; and
    an absolute heat release, measured in compliance with JAR/FAR/CS 25, App. F, Part IV & AITM 2.0006, of less than 65 kW×min/m²,
    wherein the glass pane refractive index and the organic layer refractive index have a difference therebetween that is less than or equal to 0.3,
    wherein the organic layer comprises a duroplastic reaction resin that is a polymer selected from the group consisting of phenoplasts, phenol formaldehyde resins, aminoplasts, urea formaldehyde resins, melamine formaldehyde resins, epoxide resins, unsaturated polyester resins, vinyl ester resins, phenacrylate resins, diallyl phthalate resins, cross-linking polyurethane resins, polymethacrylate reaction resins, and polyacrylate reaction resins, and any combinations thereof.

2. The lightweight composite pane according to claim 1, wherein the lower limit is greater than or equal to 1 kg/m², the upper limit is less than or equal to 3 kg/m², the ratio is 1:0.01 to 1:0.9, the thickness of the layer is less than or equal to 350 μm, and the absolute heat release of less than 50 kW×min/m².

3. The lightweight composite pane according to claim 1, further comprising a fire protection property with a flame time after removal of the flame in the vertical Bunsen burner test, measured in compliance with FAR/JAR/CS 25, App. F, Part I, of less than 15 s.

4. The lightweight composite pane according to claim 1, further comprising a transparency of greater than 80%.

5. The lightweight composite pane according to claim 1, further comprising an optical scattering behavior of less than or equal to 1.5%.

6. The lightweight composite pane according to claim 1, wherein the thickness of the mineral glass pane is less than or equal to 1 mm and greater than or equal to 200 μm.

7. The lightweight composite pane according to claim 1, wherein the mineral glass pane is selected from the group consisting of a lithium aluminum silicate glass, a soda-lime silicate glass, a borosilicate glass, an alkali aluminosilicate glass, an alkali-free aluminosilicate glass, a low-alkali aluminosilicate glass, a chemically hardened lithium aluminum silicate glass, a chemically hardened soda-lime silicate glass, a chemically hardened borosilicate glass, a chemically hardened alkali aluminosilicate glass, a chemically hardened alkali-free aluminosilicate glass, a chemically hardened low-alkali aluminosilicate glass, a thermally hardened lithium aluminum silicate glass, a thermally hardened soda-lime silicate glass, a thermally hardened borosilicate glass, a thermally hardened alkali aluminosilicate glass, a thermally hardened alkali-free aluminosilicate glass, and a thermally hardened low-alkali aluminosilicate glass.

8. The lightweight composite pane according to claim 1, wherein the mineral glass pane is a mineral glass-ceramic pane selected from the group consisting of a ceramicized aluminosilicate glass, a ceramicized lithium aluminosilicate glass, a chemically hardened ceramicized aluminosilicate glass, a chemically hardened ceramicized lithium aluminosilicate glass, a thermally hardened ceramicized aluminosilicate glass, and a thermally hardened ceramicized lithium aluminosilicate glass.

9. The lightweight composite pane according to claim 8, wherein the mineral glass pane is a chemical hardened mineral glass-ceramic pane having an ion-exchange depth of greater than or equal to 30 μm.

10. The lightweight composite pane according to claim 1, wherein the mineral glass pane has a surface compressive stress that is greater than or equal to 500 MPa.

11. The lightweight composite pane according to claim 1, wherein the mineral glass pane has an internal tensile stress that is less than or equal to 50 MPa.

12. The lightweight composite pane according to claim 1, wherein the mineral glass pane has a 4-point bending strength that is greater than or equal to 550 MPa.

13. The lightweight composite pane according to claim 1, wherein the mineral glass pane has a modulus of elasticity that is greater than or equal to 68 GPa.

14. The lightweight composite pane according to claim 1, wherein the mineral glass pane has a sheer modulus that is greater than or equal to 25 GPa.

15. The lightweight composite pane according to claim 1, wherein the mineral glass pane has a Vickers hardness that is greater than or equal to 550 HV 2/20.

16. The lightweight composite pane according to claim 1, wherein the layer further comprises fillers.

17. The lightweight composite pane according to claim 1, wherein the layer has a transparency that is greater than 80%, the lightweight composite pane further comprising a haze that increases by less than 1% owing to the layer.

18. The lightweight composite pane according to claim 1, wherein the layer has an outward-facing surface having a waviness of less than or equal to 100 nm and a roughness $R_T$ of less than or equal to 30 nm.

19. The lightweight composite pane according to claim 1, wherein the layer has an optical retardation that is not greater than 20 nm.

20. The lightweight composite pane according to claim 1, wherein the layer has a streak that is less than 100 nm.

21. The lightweight composite pane according to claim 1, wherein the layer has a modulus of elasticity that is less than 5 GPa.

22. The lightweight composite pane according to claim 1, further comprising a difference in a refractive index of the mineral glass pane and the layer that is less than or equal to 0.3.

23. The lightweight composite pane according to claim 1, wherein the mineral glass pane is thermally prestressed, chemically prestressed, or a combination of thermally and chemically prestressed.

24. A lightweight composition pane for viewing windows according to claim 1, wherein the difference between the refractive index of the glass pane and the refractive index of the organic layer is less than or equal to 0.2.

25. A lightweight composition pane for viewing windows according to claim 1, wherein the difference between the refractive index of the glass pane and the refractive index of the organic layer is less than or equal to 0.15.

26. A lightweight composition pane for viewing windows according to claim 1, wherein the refractive index for the glass pane is between 1.508 and 1.52 at 588 nm wavelength.

* * * * *